(No Model.)
C. FRIBERG.
HAY FORK.
No. 252,308. Patented Jan. 17, 1882.
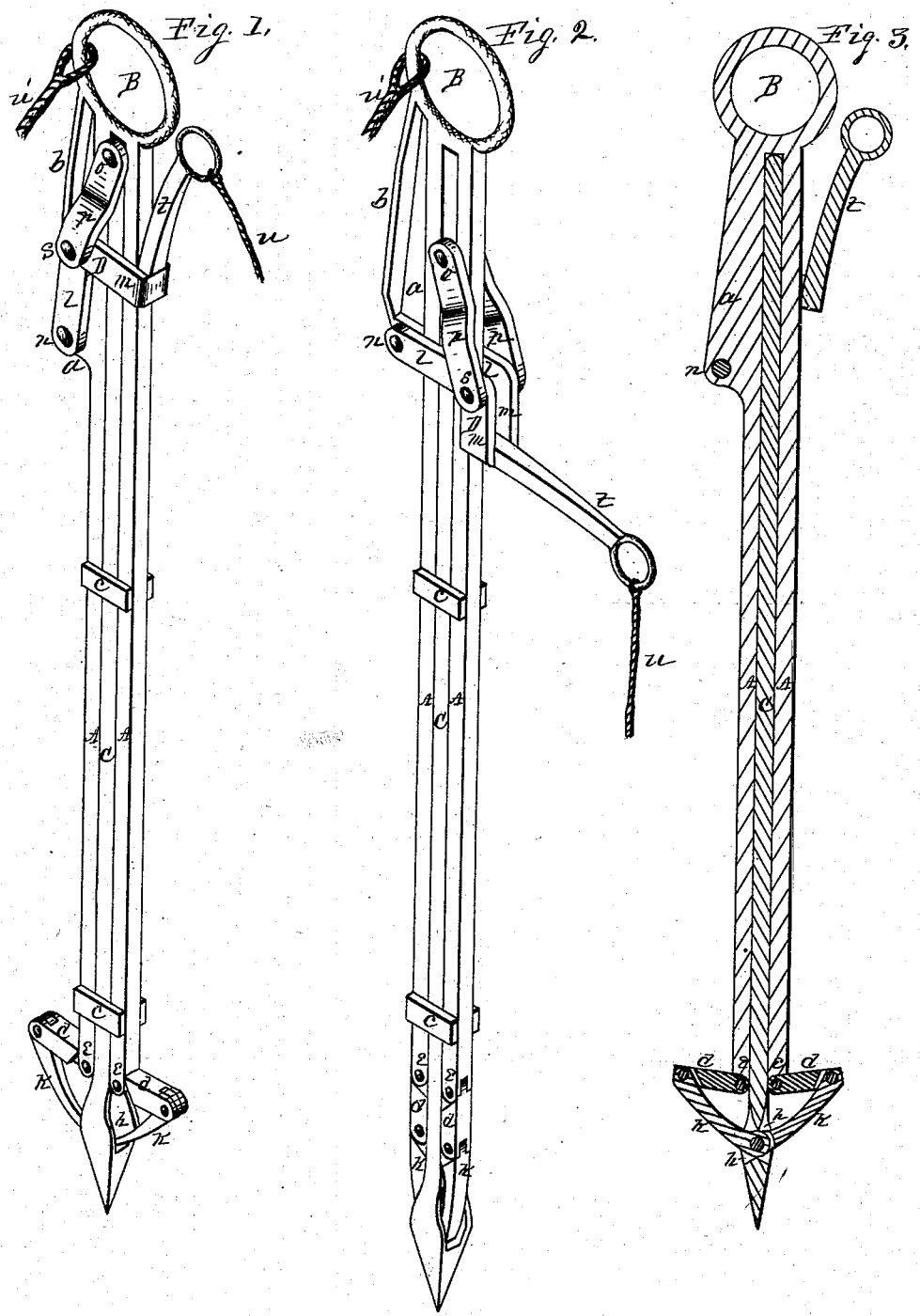
Witnesses,
A. O. Behel
M. E. Haight
Inventor.
Charles Friberg,
Per Jacob Behel.
Atty.

UNITED STATES PATENT OFFICE.

CHARLES FRIBERG, OF ROCKFORD, ILLINOIS.

HAY-FORK.

SPECIFICATION forming part of Letters Patent No. 252,308, dated January 17, 1882.

Application filed August 19, 1881. (No model.)

*To all whom it may concern:*

Be it known that I, CHARLES FRIBERG, a citizen of the United States, residing in the city of Rockford, in the county of Winnebago and State of Illinois, have invented a new and useful Power Hay-Fork, of which the following is a specification.

My invention relates to that class of power or horse hay-forks known as the "harpoon" hay-fork; and its object is to provide a reliable fork of cheap construction, and capable of use, in connection with horse or other power, for the purpose for which this class of forks are used.

In the accompanying drawings, Figure 1 is an isometrical representation of my improved fork with the parts in position as when loaded. Fig. 2 is also an isometrical representation of my improved fork with the parts in position to be inserted into the mass of hay or to discharge the hay therefrom. Fig. 3 is a central vertical section cut through the several bars of the fork.

In the several figures, A represents parallel metallic bars, mainly of the same size and form, rectangular in cross-section, having fixed to their upper end a ring, B, of suitable size to receive the main elevating-rope. The upper portion of one of these bars is enlarged, as at a, having its outer edge provided with a flange, b, rising from its outer edge on opposite sides, for a purpose to be hereinafter described. These bars are joined at proper points by suitable transverse bars, c, securely fixed to the parallel bars, and spanning the space between them in such a manner as to form a grooved way between the bars, open at their lower or free ends.

At C is represented a center bar, fitted to enter and slide freely endwise in the groove guideway. The lower end of this center endwise-sliding bar is of spear shape, centrally slotted, as at h.

At d are represented the upper arms of the barb portion or lifting-tines of the fork. One end of these arms is pivoted to the lower or free end of the parallel bars A by a suitable hinge-joint connection, as represented at e, to permit of a free joint action.

At k is represented brace-arms, having a hinge-joint connection at one end with the outer or free ends of the carrying-arm d, and at their other or lower ends are centrally pivoted in the slot h of the spear-point end of the slide-bar in such a manner that when the center sliding bar is extended or moved outward the arms will be folded to form a continuation of the outer sides of the parallel bars and a pointed bar, as represented in Fig. 2, adapted to enter the mass of hay or other material freely, and when the center bar is drawn up the carrying-arms, by means of their hinged joint connection with the several parts, will be carried to a horizontal or upwardly-inclined position, as represented in Figs. 1 and 3, to engage the hay.

At D is represented a two-branch angle-lever, composed of the arms l, rectangular in cross-section, bent into the form represented in the drawings, with the arms l and loop portion m. These are adapted to span the parallel and center bars freely in such position that the free ends of the arms l will embrace the lower portion of the enlargement a, to which they are pivoted loosely by means of a suitable rivet, n, passing through the parts.

The upper end portion of the sliding center bar C is provided with outward-projecting studs o, which receive the upper ends of links p, provided with holes to receive the studs, which are then riveted, to hold the links thereon in a free manner. The two-branch lever at the angle formed in the arms thereof is provided with outward-projecting studs s, which receive the lower end of the links p, provided with holes to receive the studs, which are riveted to fix the parts in a free joint manner, and the loop-portion m of this lever is such as to carry the central joint, s, beyond a line drawn from the center of the joint n to the center of the joint o, which, when the fork is loaded, produces a lock-joint to prevent accidental unloading. The angle-lever at its loop portion is provided with a lever-arm, t, rising therefrom, having its free end fitted in ring form to receive a tripping-rope, u, employed to break the lock-joint to unload the fork.

At u' is represented the elevating-rope, employed to elevate the loaded fork. The flange b is designed to overlap the lock-joint of the levers, operating as a shield to protect it, to prevent the accidental unloading of the fork.

In use my improved fork is employed in the usual manner, having the elevating-rope u' fixed to the ring B of the fork, suitably mounted in pulleys on carriers, and connected to a sufficient power, and the tripping-rope within reach of an attendant. The tripping-lever is then turned downward from its position in Fig. 1 to its position in Fig. 2, in which movement the parts will also be changed to their position in Fig. 2, with the hinged arms of the barbs within the dimensions of the parallel and center bars, in which position the pointed bar is then thrust into the hay. The trip lever is then placed in its elevated position, which will put the parts in their position, as at Fig. 1, ready to be elevated; and when the fork with its load is elevated and transferred to the place of deposit the attendant, by a pull upon the trip-rope, will break the lock-joint and permit the parts to assume their position, as represented in Fig. 2, and permit the load to slip from the fork. This operation may be repeated until the work is completed.

I claim as my invention—

1. In a hay-fork, the combination, with the parallel bars and central sliding bar, of a two-armed lever arranged to span the bars and pivoted to a projection on the side thereof, and links $p\ p$, pivoted to the central bar and said two-armed lever, substantially as set forth.

2. The combination, with the parallel bars, one of which is provided with a flange, $b$, and the sliding bar, of the two-armed lever spanning said bars and pivoted to a projection of one of the parallel bars, and links $p\ p$, pivoted to the sliding bar and two-armed lever, as and for the purpose set forth.

CHARLES FRIBERG.

Witnesses:
A. O. BEHEL,
JACOB BEHEL.